Feb. 22, 1927.

H. A. MEISSNER 1,618,292

TURBINE BLADE LASHING

Filed July 30, 1925

WITNESSES:

H. A. Meissner
INVENTOR
BY
ATTORNEY

Patented Feb. 22, 1927.

1,618,292

UNITED STATES PATENT OFFICE.

HERMAN A. MEISSNER, OF ST. PETERSBURG, FLORIDA, ASSIGNOR TO WESTINGHOUSE ELECTRIC & MANUFACTURING COMPANY, A CORPORATION OF PENNSYLVANIA.

TURBINE-BLADE LASHING.

Application filed July 30, 1925. Serial No. 46,967.

My invention relates to elastic fluid turbines, more particularly to the blading thereof, and has for its object the provision of lashing means therefor which shall be simple of design, easy of manufacture and application, and which shall provide a rigid blade structure effective to minimize vibration thereof.

Figure 1:
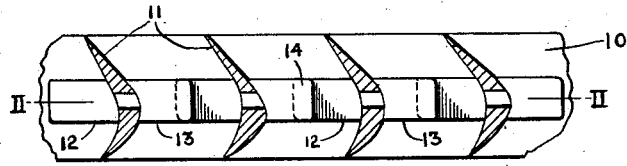
Figure 2:
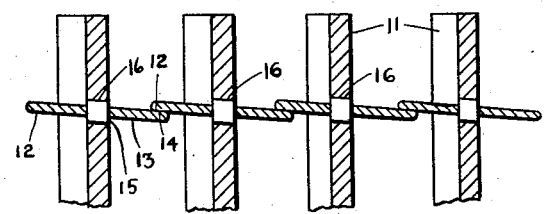
Figure 3:
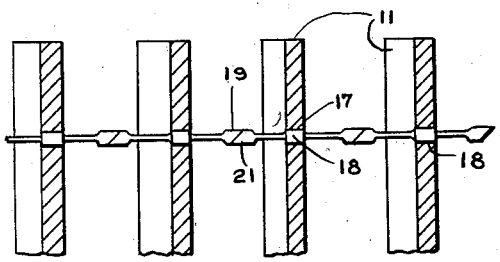
Figure 4:
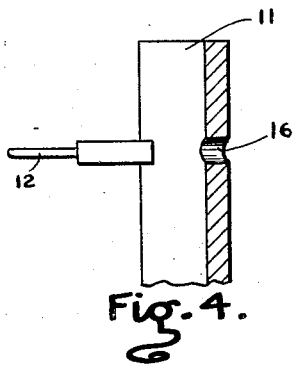

Apparatus embodying features of my invention is illustrated in the accompanying drawing forming a part of this specification, in which Fig. 1 is a sectional view, in plan, of a segment of four turbine blades having my improved lashing means applied thereto; Fig. 2 is a longitudinal sectional view along the line II—II of Fig. 1; Fig. 3 is a longitudinal sectional view similar to Fig. 2 illustrating a modified form of my invention; and Fig. 4 is a view of a blade and lashing member illustrative of the process of application.

Turbine blade lashings have heretofore been proposed comprising a continuous lashing member extending through a series of aligned holes in the blades and distorted adjacent the blade surfaces in order to secure the members in the blades. Difficulties have been encountered with this form of lashing, however, due to the fact that the lashing wire is inserted in a row, or segment, of blades upon assembly in the turbine and in that position the only engagement possible to obtain with the blade surfaces is that obtainable by squeezing, or otherwise forcing, a part of the metal of the lashing member so as to overhang the hole in which it is inserted. Due to the rounded contour of the blade surface, the overhung portion of the distorted lashing can only have a very limited contact with the blade and tends to work loose in operation.

Confronted with this difficulty, it has been found necessary to supplement the distortion of the metal of the lashing member by soldering or brazing it to the blade in order to firmly secure it thereto. The latter method, however, has been found in some instances to have a deleterious effect upon the physical properties of the blades due to the high melting point of the solder or brazing spelter employed.

The before-mentioned difficulties are overcome, in accordance with my invention, by choosing a lashing material having a coefficient of expansion substantially equal to that of the blade material and cutting the lashing material into relatively short pieces. The lashing members, which are preferably round, are then flattened at one end and inserted into a hole provided in the blade during the process of manufacture. The end inserted in the blade is made to extend beyond the blade and is, in turn, flattened and widened adjacent the blade so as to force the distorted portion thereof into a close engagement with a relatively large surface of the blade and thus bring it into tight engagement therewith. Inasmuch as this form of lashing is applied to the blades in the process of manufacture, the work is readily accessible and may be done far more effectively than after the blades are mounted in a blade holding element. The ends of the extended portions of the lashing members are arranged to overlap each other in part, upon assembly of the blades, and may thus be joined together at a point remote from the blades by fusion of metal. The heating incident to the joining process, being at a point remote from the blade surface, has no bad effect on the physical characteristics of the blades. Furthermore, by choosing a lashing material having a coefficient of expansion substantially equal to that of the blade material, alternate heating and cooling of the blading in operation does not tend to loosen the lashing in the blades.

Referring now to the drawings for a better understanding of my invention I show in Fig. 1 a fragment of a blade holding element 10 having a series of blades 11—11 mounted thereon and having my improved lashing applied thereto. The lashing comprises members having two flattened portions 12 and 13 extending forwardly and rearwardly of each blade in a row and a portion 15 extending through the blade. The portions 12 and 13 overlap intermediate the blade at 14, between adjacent blades in a row, as may be more clearly seen by reference to Fig. 2. In accordance with the modification shown in Figs. 1 and 2, the portions 12 and 13 are made to overlap between adjacent blades by providing holes 16—16 for the portion 15 in the blades, inclined to the transverse axes of the blades.

In applying my improved lashing, a lashing member is cut from round stock and has its end 12 flattened, as shown in Fig. 4, leaving the other end conforming to the contour of the hole 16 in the blades. The hole 16 in the blade is made of such diameter that the lashing member fits snugly therein. After inserting the lashing member in the hole the portion extending through the blade is flattened and crushed to such an extent that it forms an engagement with a relatively large portion of the rounded surface of the blades and is thus caused to come into tight engagement therewith. This step in the application of the lashing, being carried out in the process of manufacture of individual blades separate from the blade carrying element, may be very effectively done, resulting in a more efficient attachment of the lashing member to the blade than is possible to obtain with the blades in place in a blade holding element. It may thus be seen that the lashing members are in effect rivets having elongated heads extending forwardly and rearwardly of the respective blades and flattened in the direction of motive fluid flow.

Referring now to Fig. 3 I show a modified form of my invention which differs from that in Figs. 1 and 2 in that holes 17—17 are provided in the blades 11 normal to the longitudinal axes of the blades. Inserted in the holes 17 are lashing members 18 which are flattened on each side of the blade adjacent the surface thereof and are left round at the ends with bevelled surfaces 19 and 21, respectively, overlapping each other. The process of flattening and securing the lashing members 18 in the blades 11 may be carried out with this modification in the same manner as illustrated in Fig. 4, thus providing a secure attachment of the lashing members to the blades. With either form of the invention, the overlapping portions of the lashing members may be readily joined together intermediate the blades by soldering, brazing or welding, preferably by the latter method. When thus joined together, the resulting structure offers the maximum of resistance to vibration.

From the foregoing it will be apparent that I have invented an improved turbine blade lashing easy of application, simple of construction and effective to offer the maximum resistance to vibration of the blades, and a minimum retardation to the flow of the elastic medium.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. Lashing means for a row of turbine blades comprising individual members riveted in each of the blades extending forwardly and rearwardly thereof and joined together intermediate adjacent blades.

2. In a turbine, the combination of a blade carrying element, a row of blades mounted thereon having a series of holes provided therein, individual lashing members extending through and secured in each of the holes, and joined together intermediate adjacent blades.

3. In a turbine, the combination of a blade carrying element, a row of blades mounted thereon having a series of holes provided therein, individual lashing members secured in each of the holes by distortion of metal on each side of a blade and joined together intermediate adjacent blades by fusion of metal.

4. In a turbine, the combination of a blade carrying element, a row of blades mounted thereon having a series of holes provided therein, lashing members extending forwardly and rearwardly of each of the blades, riveted in each of the holes and joined to lashing members of adjacent blades by fusion of metal.

5. In a turbine, the combination of a blade carrying element, a row of blades mounted thereon having a series of holes provided therein, lashing members riveted in each of the holes and extending forwardly and rearwardly of each of the blades and formed to overlap portions of adjacent members, which overlapping portions are joined together by fusion of metal.

6. In a turbine, the combination of a blade carrying element, a row of blades mounted thereon having a series of holes provided therein, lashing members riveted in each of the blades and extending forwardly and rearwardly thereof with portions between the blades flattened in the direction of motive fluid flow and arranged to overlap each other in part, which overlapping portions are joined together by fusion of metal.

7. In a turbine, a plurality of blades in a row, lashing members engaging in openings in the blades and secured to the latter, and adjoining ends of the lashing members being joined together intermediately of the spaces between adjacent blades.

8. In a turbine, a plurality of blades in a row, lashing members engaging in openings in the blades and secured to the latter, and adjoining ends of the lashing members being joined together by fusion of metal intermediately of the spaces between adjacent blades.

9. In a turbine, a row of blades, a lashing member for each blade having surfaces cooperating with surfaces of the blade for connecting the two, adjoining ends of the lashing members being disposed between the blades, and means for connecting the adjoining ends of the lashing members together.

In testimony whereof, I have hereunto subscribed my name this 10th day of July, 1925.

HERMAN A. MEISSNER.